United States Patent [19]

Moreaud et al.

[11] 4,255,266
[45] Mar. 10, 1981

[54] WATER PURIFICATION PROCESS

[75] Inventors: Henri Moreaud, Le Chesnay; Pierre Gilles, Sevran; Jean-Paul Leglise, Montesson, all of France

[73] Assignee: O T V (Omnium de Traitements et de Valorisation), Courbevoie, France

[21] Appl. No.: 43,709

[22] Filed: May 30, 1979

[51] Int. Cl.$^3$ .............................................. C02F 3/04
[52] U.S. Cl. .................................. 210/614; 210/617; 210/760
[58] Field of Search ................ 210/17, 150, 151, 290, 210/63 Z

[56] References Cited

U.S. PATENT DOCUMENTS

| | | | |
|---|---|---|---|
| 3,563,888 | 2/1971 | Klock | 210/17 |
| 3,803,029 | 4/1974 | Blecharczyk | 210/17 |
| 3,928,190 | 12/1975 | Bebin | 210/17 |
| 3,933,629 | 1/1976 | Smith | 210/150 |
| 4,076,616 | 2/1978 | Verde | 210/17 |
| 4,141,824 | 2/1979 | Smith | 210/17 |

*Primary Examiner*—Benoît Castel
*Attorney, Agent, or Firm*—Browdy and Neimark

[57] ABSTRACT

In a biological water purification process polluted water, including surface water to be made potable, sewage water or industrial water, is percolated through a submerged fixed bed of granular material such as activated carbon, chamottes, raw clays, etc., with an oxygenated gas being upwardly injected at an intermediate level of the bed. The water and gas delivery rates are controlled to satisfy the following relations:

$$\frac{Q_1}{S} \leq (\alpha \epsilon - K_1) v \qquad (1)$$

$$\frac{Q_2}{S} \leq \frac{K_2 \cdot R}{OD} v (\alpha \epsilon - K_1) \qquad (3)$$

and simultaneously:

$$\frac{Q_2 \cdot OD}{S \cdot h} \leq K_3 \quad \text{or} \quad \frac{Q_2}{S} \leq \frac{K_3 \cdot h}{OD} \qquad (4)$$

wherein
  $Q_1$ is the delivery of oxygenated gas in m$^3$/hr,
  $Q_2$ is the delivery of water to be treated in m$^3$/hr,
  $\epsilon$ is the porosity of the granular material bed,
  $\alpha$ is the maximum fraction of the volume that can be occupied by the gas without affecting the effectiveness of the treatment,
  S is the bed section in m$^2$,
  h is the height of the bed in meters,
  v is the vertical component of the average speed of the ascending gas bubbles in m/hr,
  $K_1$ is a constant corresponding to the fraction of volume of bed occupied by immobilized gas pockets in m$^3$,
  $K_2$ is the concentration of gas in oxygen in kg/m$^3$,
  $K_3$ is the value of the demand for oxygen that 1 m$^3$ of granular material can satisfy in 1 hour under operating conditions of the process (in kg/m$^3$/hr),
  R is the total transfer yield (or the fraction: weight of oxygen effectively dissolved/weight of oxygen injected in the bed), and
  OD is the demand for oxygen to be met, in kg per unit of volume of water to be treated.

14 Claims, No Drawings

WATER PURIFICATION PROCESS

FIELD OF THE INVENTION

This invention deals with the field of purification, particularly biologically, of waters of any type, such as industrial waters, waste waters or water supplies to be made potable.

BACKGROUND OF THE INVENTION

Purification of waters, whether surface or waste, has been the object of numerous studies that have led to the development of processes that can be grouped, in a summary fashion, as follows:

(a) processes of coagulation-flocculation-decantation-filtration on sand (on surface);

(b) also purely mechanical filtering processes, but in the mass;

(c) so-called biological filtering processes, simultaneously resorting to the action of microorganisms assuring degradation of the organic impurities contained in the water;

(d) processes of adsorption on activated carbon, after flocculation-decanting and possibly filtering on sand;

(e) treatments with activated sludge;

(f) treatments with bacterial beds.

It can be said that each of these techniques has its own advantages and drawbacks, without any of them being totally satisfactory, so that it is often necessary to combine them and thus use complex and costly treatment lines.

Without going into the details of the successive operations that water has to undergo to treat it, it can be said overall that most of these processes require the use of rather voluminous bulky equipment arranged in series so that the total treatment time can come to several hours.

To overcome these drawbacks, there was proposed in U.S. Pat. No. 4,076,616 a process of type (c) to eliminate pollution biologically in a carbon bed, according to which there is injected in this bed a gas containing oxygen to supply to the microorganisms developing in this bed the oxygen that they require. Thus, thanks to the combination of a depth filtration and the use of constantly aerated activated carbon, more complete treatment is performed in a few minutes in a single compact work.

In the process which is the object of said patent, limitations were introduced for parameters such as, for example, the time of contact of the water to be treated with the activated carbon and the linear speed of the water through the bed. In fact, it was stated that this speed should not exceed 2 m/hour to keep intact the "connective tissue" formed by the bacterial colonies that develop between the carbon particles and thus contribute to purification of the water while retaining the particles in suspension in this water.

SUMMARY OF THE INVENTION

Since one of the factors causing the effectiveness of the treatment is indeed the existence of microorganisms fixed on the carbon, the present applicants began with a new idea and, after a series of tests, were able to show that the linear speed did not have a determining role on the risks of rupture of the connective tissue and that other factors broadly had to be considered, particularly the delivery of oxygenated gas which, after a certain amount, entails an erosion of the connective tissue.

Systematic study and research were then conducted by the applicants to be able to determine, according to this new idea, a general equation permitting an application of the process to any type of polluted water to obtain a predetermined and desired rate of purification.

To determine the equation corresponding to this idea, it was necessary to research, on the one hand, the relations between the delivery of water to be treated and the delivery of oxygenated gas blown into the activated carbon bed and, on the other hand, the influence on these deliveries of such parameters as the nature and constitution of the bed and the amount of pollution it was possible to eliminate per $m^3$ of carbon per hour.

Before specifying the scope of the present invention and the technological improvements flowing therefrom in such a base purification process on a fixed bed, there will be summarized first below the main results of the studies made on the interactions of the principal and secondary parameters influencing the process.

First, tests showed that for water deliveries going up to 10 $m^3$ of water per hour and per $m^2$ of section of bed of granular material, it was possible to define an alpha parameter corresponding to the maximal proportion of interstices of the bed occupied by the oxygenated gas without compromising the functioning of this bed, for the length of a cycle defined by the interval between two successive countercurrent washings of the bed. Considering the rate of movement of the gas in the bed, it was possible to establish that the delivery of oxygenated gas should satisfy the following relation:

$$\frac{Q_1}{S} \leq (\alpha \epsilon - K_1) v \quad (1)$$

wherein $Q_1$ is the delivery of oxygenated gas in $m^3/hr$; $\epsilon$ is the porosity of the bed, i.e., the volume available outside the carbon; $\alpha$ is the maximum fraction of the preceding volume that can be occupied by the gas without affecting the effectiveness of the treatment; S is the section of the bed in $m^2$; v represents the vertical component of the average speed of the gas bubbles ascending in the bed, in $m^3/hr$; and $K_1$ is a constant corresponding to the fraction of the volume of the bed occupied by immobilized gas pockets.

To find the relation linking the delivery of oxygenated gas to the delivery of water to be treated, it is necessary to state that the delivery of injected gas should procure for the granular bed the amount of dissolved oxygen strictly necessary for biological purification. If OD indicates the demand for oxygen to be met in kilogram per unit of volume of water to be treated, the relation can be established:

$$\frac{Q_2 \cdot OD}{K_2 \cdot R} \leq Q_1 \quad (2)$$

wherein $Q_2$ is the delivery of water to be treated in $m^3/hr$; R is the overall transfer yield, i.e., the fraction kilograms of oxygen effectively dissolved/kilogram of oxygen injected in the bed; and $K_2$ represents the concentration of oxygen in the gas, expressed in $kg/m^3$.

Replacing $Q_1$ in equation (2) by its value drawn from relation (1) the relation pertaining solely to the water yield is obtained, namely:

$$\frac{Q_2}{S} \leq \frac{K_2 \cdot R}{OD} v(\alpha\epsilon - K_1) \quad (3)$$

Actually, for an optimal utilization of the process this delivery of water $Q_2$ should be kept at a value at least equal to the aptitude of the bed biologically to satisfy the oxygen demand OD, the condition then being able to be written:

$$\frac{Q_2 \cdot OD}{S \cdot h} \leq K_3 \quad (4)$$

wherein h is the height of the bed of granular material in meters and $K_3$ represents the capacity of the bed biologically to eliminate the OD (or the value of OD that 1 m$^3$/hr; of granular material can satisfy in 1 h).

In practice, as can be seen below, the effectiveness of the process is kept at its optimal rate by placing in the water to be treated a probe for measuring the dissolved oxygen which constantly controls the supply of oxygenated gas so as to supply at each moment the amount of oxygen strictly necessary and sufficient.

According to its more general definition, the water purification process according to the present invention therefore consists in the known technique of percolation of water through a fixed bed of granular material aerated at an intermediate level, adjusting the deliveries of water to be treated and the oxygenated gas to be injected so that the following relations are respected:

$$\frac{Q_1}{S} \leq (\alpha\epsilon - K_1)v \quad (1)$$

$$\frac{Q_2}{S} \leq \frac{K_2 \cdot R}{OD} v(\alpha\epsilon - K_1) \quad (3)$$

and simultaneously:

$$\frac{Q_2 \cdot OD}{S \cdot h} \leq K_3, \text{ or } \frac{Q_2}{S} \leq \frac{K_3 \cdot h}{OD} \quad (4)$$

each of said parameters having definitions as given above.

As will be seen in the specification relating to the above example embodiments and according to the above relations, the relative regulating of deliveries $Q_1$ and $Q_2$ is performed by acting on one or another of the influencing parameters. For example, if the increase of the delivery of water to be treated leads to increasing the delivery of oxygenated gas beyond the limiting value for the desired objective, it is then possible either to act on the oxygen concentration of the gas; use bed heights better suited to the product to be treated, due allowance being made for factor R; or again adopt systems of diffusion of the oxygenated gas at different levels in the granular bed, which moreover makes it possible to reduce the agitation of the zones of the bed located below the highest level of introduction of the gas.

DETAILED DESCRIPTION OF PREFERRED EMBODIMENTS

The various parameters included in relations (1), (3) and (4), set forth hereinabove, are obviously a function of the type of water to be treated, the particular type of fixed bed used, and the oxygenating gas used, and each can vary within more or less broad limits. However, under the most general and most current conditions of water purification according to the process of the present invention, the numeric values will generaly be expressed as follows:

$\epsilon$, which is a function of the shape of the grains and their arrangement in the bed, is generally between 0.45 and 0.55, for example, close to 0.50 when activated carbon is used;

$K_1$ is on the order of 0.02 to 0.08 m$^3$ of bed volume occupied by immobilized gas pockets per m$^3$ of total bed, for example, close to 0.04 m$^3$/m$^3$;

$K_2$ is generally between 0.20 and 1.40 kg/m$^3$;

$\alpha$ is normally between 0.2 and 0.6, usually between 0.35 and 0.45;

v, under usual operating conditions (for a given temperature, water rate, granulometry and shape of granular material), is between 200 and 400 m/h, often close to 300 m$^3$/hrs;

for a given oxygen content $K_2$ of aeration gas, the yield R is a function of the saturation concentration ($C_S$) and the real concentration (C) reached in the bed, according to the formula:

$$R = K(C_S - C)$$

where K is a proportionality constant taking into account such parameters as salinity, temperature, agitation constituents and bed height. For example, in the case where the blown gas is air and for a bed with a height between 1 and 3 meters, the values of K are generally between:

$$2.7 \times 10^{-3} < K < 25 \times 10^{-3} \text{ (mg/l)}^{-1} \text{ m}^{-1};$$

the experimental value $K_3$ is generally less than 0.5 kg of $O_2$ per hour and per m$^3$ of carbon; it is higher, the stronger the dissolved oxygen concentration which is maintained;

the oxygen demand OD is a function of the characteristics of oxygen consumption and the desired degree of purification. Besides the immediate chemical demand for oxygen, its determination takes into account elimination of the BOD (biological demand for oxygen), of the COD (chemical demand for oxygen) and possible nitrification phenomena of the water. When the treatment aims only at elimination of the BOD, OD is generally:

$$0.7 \leq OD/BOD_5 \leq 1.2 \quad (5)$$

Of course, the total OD corresponding to the elimination of the carbon and nitrogen pollutants is written according to the general formula:

$$OD = (0.7 \text{ to } 1.2) BOD_5 + (4 \text{ to } 5) N \text{ (of NH}_4).$$

By way of illustration and independently of the embodiments that will appear below in the description, there can be indicated below a mode of application of the above mathematical relations defining the process of the invention.

It is assumed that an urban waste water ($K_3 = 0.31$) is treated by percolation on an activated carbon bed 2 meters high with insufflation of atmospheric air at about 30 cm from the lower level of the carbon layer. The BOD at the input is 180 mg/l and it is desired to bring it to a value of 30 mg/l. The difference in the BOD at the input and output therefore should be: BOD = 150. By adopting for the oxygen demand OD the second term of relation (5), we have OD = $1.2 \times \Delta BOD = 0.180$ kg of $O_2$/m$^3$.

The first condition to be met, linked to the treatment capacity of the activated carbon according to relation (4), will be written:

$$\frac{Q_2}{S} \leq \frac{K_3 \cdot h}{OD} = \frac{0.31 \times 2}{0.180} = 3.50 \, m^3/m^2/hr$$

According to the second condition, it should be verified that all the oxygen necessary for treatment can be transferred to the bed, which is expressed by relation (3), namely:

$$\frac{Q_2}{S} \leq \frac{K_2 R}{OD} v (\alpha \epsilon - K_1)$$

Considering the $O_2$ content of the air under normal conditions, it is known that $K_2 = 0.28$ kg $O_2/m^3$ of air. Further, by experimentation and measurements there can be determined the following values of other parameters: $R = 0.05$; $v = 300$ m/hr; $\alpha = 0.4$; $\epsilon = 0.5$; $K_1 = 0.04$. By applying inequality (3) there is therefore obtained:

$$\frac{Q_2}{S} \leq \frac{0.28 \times 0.05}{0.180} \times 300 \times 0.16 = 3.73 \, m^3/m^2/hr$$

To meet the two above conditions according to the process of the invention one is led to choose the lesser of the two calculated deliveries, namely 3.50 $m^3/m^2/hr$ which represents the amount of air strictly to be injected into the activated carbon bed. As will be seen below, it will be judicious, in such a case, to add under the activated carbon bed an additional filtering layer of sand or the like.

In practice, the process according to the present invention of percolation of water on an aerated fixed bed of granular material can be used in various ways, each characterized by its own technology.

According to a first embodiment, there is used as the granular material only activated carbon as in U.S. Pat. No. 4,076,616 but causing a variation in the deliveries of the water to be treated and the oxygenated gas, as for example air, in mathematical relations (1), (3) and (4) so that the conditions considered as critical in said patent are considerably broadened, particularly in regard to the speed of percolation of the water and the times of contact of the latter with the activated carbon bed. The two known favorable actions in the process of this invention, namely oxidizing biological purification in the upper zone and mechanical filtration in the lower zone, are notably reinforced by the improvement of the process of the invention because of the extension of the period of activity of the carbon between two regenerations in relation to its use as a simple adsorbent and, moreover, the possibility of considerably increasing the speed of passage of the water through the filter, which can come to 6 to 10 meters per hour, while profiting from the totality of the advantages of the process.

According to another embodiment, there is used as filtering material a combination of an activated carbon layer and, placed under it, a layer of a material with a lower granulometry and higher density, as, for example, sand. Actually, when the gas delivery $Q_1$ exceeds a certain value, an uncoupling of the bed, then a washing away of the pollution particles fixed on the carbon can occur. Thanks to the introduction of an underlying layer of fine sand, or the like, this drawback can be alleviated. This embodiment is particularly advantageous in the case of treating a surface water (not provided in the prior patent cited) because there is thus obtained in a single step, with possible addition of a slight amount of flocculant reagent, a potable water meeting usual standards. It is known that in known techniques, treating a raw surface water charged with pollution requires numerous operating steps such as: coagulation-flocculation, decanting, filtering on activated carbon, etc.

According to a variant of this embodiment, it can also be advantageous, to improve the life of the beds, to insert between the activated carbon bed and sand bed a layer of a third granular material with a density between that of activated carbon and sand, for example, anthracite. This inserted layer, with a thickness that can vary according to needs, has the role of protecting the activated carbon bed against the abrasive action of the grains of sand during filtering or washing.

It should also be noted that, thanks to the process according to the present invention, in particular with multilayers of granular materials, washings become much less frequent, and often can be brought from daily to weekly.

Actually, any granular material other than activated carbon can be used to make the fixed bed provided that it exhibits: a good mechanical resistance so as not to sustain abrasion during the bed washing cycle; a suitable granulometry, generally between 1 and 8 mm; and an aptitude for fixing at least one of the elements necessary for biochemical reactions: bacteria (or enzymes), carbon or ammonia pollutants and oxygen.

Other granular materials that can be cited in a non-limiting way are: fired clays or chamottes, doped or not with trace elements serving as nutriments for the microorganisms; certain raw clays of the illitic, kaolitic or montmorillonitic type; hydrated silicates such as pozzolanas; and activated alumina or equivalent products.

The oxygenated gas used for injection at a point of the bed can be made up of air or any other oxygenated gaseous fluid. According to an advantageous embodiment, there can be used for this purpose oxygen, air containing oxygen or an ozonized gaseous mixture, coming, for example, from recycling an atmosphere rich in ozone lying over a water disinfected with ozone. It is further advised, in the case of treating a surface water to make it potable, to subject it to a prior oxidation with ozone. There are realized, thanks to the recovery of this ozone for injection in the bed, according to the invention, a savings and an activation of the biological process. Actually, it has been found that prior ozone treatment or use of ozonized air gives rise to synergetic effects in the process according to the present invention, particularly because the ozone modifies the organic molecules contained in the water by making them more accessible to a further biodegradation.

In the case of water containing particles with a high clogging activity, such as algae, these algae easily go through the carbon layer with a high granulometry and rapidly clog the upper layer of the sand bed. Therefore, it is advantageous to subject this upper zone to an agitation to increase the life of the sand layer.

Other advantanges of the invention will become more clear in the following illustrative examples which relate to treatment either of industrial or waste waters or surface waters to make them potable.

EXAMPLES

(A) Waste Waters

There were treated, under conditions according to the present invention, various waste waters in pilot or semi-industrial installations, by determining the value of the principal parameters such as those defined in formulas (1), (3) or (4) above.

The overall results are given in table 1 below, it being specified that:

For example 1, treatment of urban water slightly charged with organic materials and oxidizable nitrogen was involved. The oxygenated gas was made up of air with a delivery of 14 m³/hr.

For example 2, the water to be treated was a standard urban water where it was necessary to eliminate only hydrocarbon pollution. Air at a delivery of 28 m³/hr was used.

In example 3, the same type of water as in example 2 was used, but with the treatment being continued to nitrification, the oxygen demand (OD) was then equal, in table 1, to the sum of the biochemical demands for oxygen and oxidized nitrogen. The oxygenated gas injected was air with a delivery of 21 m³/hr.

In example 4, a mixture of urban water and industrial water requiring a strong oxygen demand was used. Because of this, an oxygen enriched gas containing 600 g of $O_2$ per m³ with a delivery of 8.33 m³/hr and recycling of the gas was used.

In example 5, there was involved an industrial water which was treated with an oxygenated gas of the same type as for example 4 (at 600 g of $O_2/m^3$) with a delivery of 8.33 m³/hr with recycling.

For all these tests, there was used an activated carbon bed with a granulometry of 1.5 to 4 mm and a height of 2 meters, for which $\epsilon = 0.5$ and $\alpha = 0.4$ (value for which the cycles remained above 24 hours). Injection of the oxygenated gas was performed at an intermediate level of the activated carbon bed.

The times of contact of water with the mass of carbon layer above the intermediate level of the bed was comprised between 18 and 23 minutes for examples 1 to 3.

Finally, the various parameters of column 1 of the table are expressed in units specified during the above specification.

TABLE I

| Influence Parameters | EXAMPLES | | | | |
|---|---|---|---|---|---|
| | No. 1 | No. 2 | No. 3 | No. 4 | No. 5 |
| OD | 0.084 | 0.195 | 0.324 | 0.352 | 1.45 |
| $(C_S - C)$ | 5 | 7.5 | 6 | 15 | 15 |
| $K (\times 10^{-3})$ | 7 | 4.8 | 5.6 | 6.9 | 6.9 |
| $K_1$ | 0.04 | 0.04 | 0.04 | 0.04 | 0.04 |
| $K_2$ | 0.28 | 0.28 | 0.28 | 0.60 | 0.60 |
| $K_3$ | 0.137 | 0.275 | 0.208 | 0.45 | 0.45 |
| h | 2 | 2 | 2 | 2 | 2 |
| R(obtained) | 0.07 | 0.072 | 0.067 | 0.18 | 0.18 |
| $Q_{2/S} = \dfrac{(K_3 h)}{OD}$ | 3.26 | 2.82 | 1.28 | 2.55 | 0.62 |

Measurements showed that the rinsing rate of the bubbles (parameter v) was on the order of 300 m/hr. Under these conditions, with $\alpha = 0.4$, there was obtained a limiting value of $Q_1/S$ with relation (1) equal to (or close to) 48 m/hr, a value not attained with the waters treated according to the invention in the examples of the table.

Thanks to the present invention, it was possible with good results, to perform the purification treatment in a single stage. This treatment would normally have required using two successive installations with volumes several times greater to perform a biological treatment with activated sludge, then a secondary clarification state.

(B) Production of Potable Water From Surface Water

There was performed a series of tests of treatment of surface waters to make them potable, on a water taken from the Seine downstream from Paris. The tests were made by causing water to circulate downward in a column with a 50-cm diameter containing an upper activated carbon bed with a granulometry of 2.4 to 4.8 mm over a total height of 1.2 meters. In certain tests, there was added under the activated carbon bed a filtering layer of sand with a granulometry of 0.8 to 1.2 mm depending on a height of about 0.4 meter. The beds were submerged with a height of liquid of about 30 cm above the activated carbon bed. During percolation, performed at linear water speeds varying from 4 m/hr to 6 m/hr and corresponding to contact times of 15 to 30 minutes between the water and granular bed, air was continuously injected in the column at a delivery of about 3 m³/m²/hr, at different points, depending on the tests, namely, either at about 20 cm from the base of the activated carbon bed in the case where only this granular material was used or at the carbon-sand interface in the case of using multilayers.

The test results are summed up in Table II below where there are introduced, by way of comparison, tests of percolation of raw water on a filter made up not of activated carbon but of a fired clay (or chamotte).

TABLE II

| Type of Treatment | Turbidity | Ammonia (mg/l) | Oxygen consumed by organic materials (mg/l of $O_2$) | Color (Hazen degrees) |
|---|---|---|---|---|
| Untreated raw water | 40 | 3 | 4.5 | 20 |
| Water treated on non-absorbent (fired clay) with conditions of the present invention | 8.3 | 1.5 | 3.5 | 15 |
| Water treated according to the present invention (1 layer of activated carbon | 2 | 0 | 2.3 | 10 |
| Water treated according to the present invention, 1 layer of activated carbon + 1 layer of sand | 0.8 | 0 | 2 | 10 |
| Water treated according to the present invention; 1 layer of activated carbon + 1 layer sand; with prior ozonization of the water (2mg/l $O_3$) | 0.15 | 0 | 1.5 | 3 |

It should be noted that to obtain the excellent results entered on the two last horizontal lines, it would be necessary to use, in a standard treatment, the following successive series of stages; preoxidation of the water with chlorine, flocculation, decanting, filtering on sand, filtering on active absorbent, ozonization, final chlorination, using at least 25 to 30 mg/l of chlorine, 50 to 60 mg/l of flocculant (aluminum sulfate, for example) and 0.3 to 0.5 mg/l of a flocculation adjuvant.

The invention therefore has made it possible to obtain in a single stage a water meeting potability standards, without the use (or possibly a very slight minimum) of chemical reagents. A certain number of other advantages have been established, in particular; the possibility of using for several months the same charge of granular activated material, with washings spaced out over a week only instead of 1 to 2 days as in standard filtering; a clear savings of wash water, namely, approximately 0.3% of the water produced, instead of the usual 5% in standard processes; notable reduction of the sludge produced and their greater facility of further treatment because they are less rich in aluminum hydroxide (coming from the addition of aluminum salt as flocculant in standard processes).

Purification tests of waste waters and production of potable water, performed by replacing the activated carbon bed with beds of suitable height made up of chamottes (fired clays), raw clays (for example, kaolin and illite) and activated aluminas made it possible to obtain approximately equivalent results.

It will be obvious to those skilled in the art that various changes may be made without departing from the scope of the invention and the invention is not to be considered limited to what is described in the specification.

We claim:

1. In the process of purification of polluted water comprising percolating the water to be treated downward through a submerged fixed bed of granular material with insufflation, at an intermediate level of the bed, of a rising oxygenated gas current, the improvement wherein the linear velocity of the water through the bed exceeds 2 m/hr and the delivery of water to be treated and the delivery of oxygenated gas are otherwise regulated such that the following relations are satisfied:

$$\frac{Q_1}{S} \leq (\alpha \epsilon - K_1) v \quad (1)$$

$$\frac{Q_2}{S} \leq \frac{K_2 \cdot R}{OD} v (\alpha \epsilon - K_1) \quad (3)$$

and simultaneously:

$$\frac{Q_2 \cdot OD}{S \cdot h} \leq K_3 \text{ or } \frac{Q_2}{S} \leq \frac{K_3 \cdot h}{OD}, \quad (4)$$

wherein $Q_1$ is the delivery of oxygenated gas in m$^3$/hr, $Q_2$ is the delivery of water to be treated in m$^3$/hr, $\epsilon$ is the porosity of the granular material bed, $\epsilon$ being 0.45 and 0.55, $\alpha$ is the maximum fraction of the volume that can be occupied by the gas without affecting the effectiveness of the treatment, $\alpha$ being 0.2 to 0.6, S is the bed section in m$^2$, h is the height of the bed in meters, v is the vertical component of the average speed of the ascending gas bubbles in m/hr, v being 200 to 400 m/hr, $K_1$ is a constant corresponding to the fraction of volume of bed occupied by immobilized gas pockets in m$^3$, $K_1$ being 0.02 to 0.08 m$^3$, $K_2$ is the concentration of gas in oxygen in kg/m$^3$, $K_2$ being 0.2 to 1.40 kg/m$^3$, $K_3$ is the value of the demand for oxygen that 1 m$^3$ of granular material can satisfy in 1 hour under operating conditions of the process in kg O$_2$/m$^3$ of granular material/hr, $K_3$ being less than 0.8 kg/m$^3$/hr, R is the total transfer yield (or the fraction: weight of oxygen effectively dissolved/weight of oxygen injected in the bed), R being a function of the saturation solution ($C_S$) and real concentration (C) of oxygen in the bed according to the relation $$R = K(C_S - C)$$

wherein K is between $2.7 \times 10^{-3}$ and $25 \times 10^{-3}$ (mg/l)$^{-1}$m$^{-1}$, and OD is the demand for oxygen to be met, in kg per unit of volume of water to be treated, OD being between 0.7 and 1.2 times BOD$_5$ or total OD is 0.7 to 1.2 times BOD$_5$ plus 4 to 5 times N (of NH$_4$); and wherein said granular material includes a material exhibiting a sufficient mechanical resistance so as not to sustain abrasion during bed washing, a granulometry between about 1 and about 8 mm, and an aptitude for fixing at least one of the elements necessary for biochemical reactions.

2. In a process of purification of polluted water comprising percolating the water to be treated downward through a submerged fixed bed of granular material with insufflation, at an intermediate level of the bed, of a rising oxygenated gas current, the improvement wherein the water remains in contact with the mass of granular material above said intermediate level for a time of contact less than 30 minutes and the delivery of water to be treated and the delivery of oxygenated gas are otherwise regulated such that the following relations are satisfied:

$$\frac{Q_1}{S} \leq (\alpha \epsilon - K_1) v \quad (1)$$

$$\frac{Q_2}{S} \leq \frac{K_2 \cdot R}{OD} v (\alpha \epsilon - K_1) \quad (3)$$

and simultaneously:

$$\frac{Q_2 \cdot OD}{S \cdot h} \leq K_3 \text{ or } \frac{Q_2}{S} \leq \frac{K_3 \cdot h}{OD}, \quad (4)$$

wherein $Q_1$ is the delivery of oxygenated gas in m$^3$/hr, $Q_2$ is the delivery of water to be treated in m$^3$/hr, $\epsilon$ is the porosity of the granular material bed, $\epsilon$ being 0.45 and 0.55, $\alpha$ is the maximum fraction of the volume that can be occupied by the gas without affecting the effectiveness of the treatment, $\alpha$ being 0.2 to 0.6, S is the bed section in m$^2$, h is the height of the bed in meters, v is the vertical component of the average speed of the ascending gas bubbles in m/hr, v being 200 to 400 m/hr, $K_1$ is a constant corresponding to the fraction of volume of bed occupied by immobilized gas pockets in m$^3$, $K_1$ being 0.02 to 0.08 m$^3$, $K_2$ is the concentration of gas in oxygen in kg/m$^3$, $K_2$ being 0.2 to 1.40 kg/m$^3$, $K_3$ is the value of the demand for oxygen that 1 m$^3$ of granular material can satisfy in 1 hour under operating conditions of the process in kg O$_2$/m$^3$ of granular material/hr, $K_3$ being less than 0.8 kg/m$^3$/hr, R is the total transfer yield (or the fraction: weight of oxygen effectively dissolved/weight of oxygen injected in the bed), R being a function of the saturation solution ($C_S$) and real concentration (C) of oxygen in the bed according to the relation $$R = K(C_S - C)$$

wherein K is between $2.7 \times 10^{-3}$ and $25 \times 10^{-3}$ $(mg/l)^{-1} m^{-1}$, and OD is the demand for oxygen to be met, in kg per unit of volume of water to be treated, OD being between 0.7 and 1.2 times $BOD_5$ or total OD is 0.7 to 1.2 times $BOD_5$ plus 4 to 5 times N (of $NH_4$); and wherein said granular material includes a material exhibiting a sufficient mechanical resistance so as not to sustain abrasion during bed washing, a granulometry between about 1 and about 8 mm, and an aptitude for fixing at least one of the elements necessary for biochemical reactions.

3. A process in accordance with claims 1 or 2 wherein the granular material is activated carbon and the injection of oxygenated gas is in the lower zone of the activated carbon bed.

4. A process in accordance with claims 1 or 2 wherein said oxygenated gas is selected from the group consisting of air, pure oxygen, and an ozonized gaseous mixture coming from recycling of an atmosphere rich in ozone lying over water previously disinfected with ozone.

5. A process in accordance with claim 4, further including the step of controlling and regulating the supply of oxygenated gas serving for injection into the bed by means of a probe for measuring dissolved oxygen, said probe being placed in the water to be treated.

6. A process in accordance with claims 1 or 2 further including the step of ozonizing the water to be purified prior to said percolating step.

7. A process in accordance with claims 1 or 2 wherein said polluted water comprises surface or layer waters to be made potable, sewage water or industrial water.

8. A process in accordance with claims 1 or 2, wherein said granular material comprises a double bed containing grains of activated carbon in the upper part, and, in the lower part, grains of a finer and denser material of sand or the like.

9. A process in accordance with claim 8, wherein said granular material further includes a layer of material of intermediate density between said activated carbon and said sand-like material.

10. A process in accordance with claim 9 wherein said material of intermediate density is anthracite.

11. A process in accordance with claims 1 or 2, wherein said granular material comprises at least an upper portion, in the volume above the point of insufflation, of a member of the group consisting of fixed clays (chamottes), chamottes doped with trace elements, raw clays, hydrated silicates and activated aluminas.

12. A process in accordance with claim 11 wherein said granular material further includes, below said upper portion, a lower portion of finer and denser material of sand or the like.

13. A process in accordance with claim 12, wherein said granular material further includes a layer of intermediate density between said upper and lower portions.

14. A process in accordance with claim 13, wherein said material of intermediate density is anthracite.

* * * * *